United States Patent [19]

Rowland

[11] 3,935,359

[45] *Jan. 27, 1976

[54] RETROREFLECTIVE SHEETING AND METHOD AND APPARATUS FOR PRODUCING SAME

[75] Inventor: William P. Rowland, Southington, Conn.

[73] Assignee: Rowland Development Corporation, Kensington, Conn.

[ * ] Notice: The portion of the term of this patent subsequent to Aug. 15, 1989, has been disclaimed.

[22] Filed: Feb. 13, 1974

[21] Appl. No.: 441,950

Related U.S. Application Data

[63] Division of Ser. No. 265,736, June 23, 1972, Pat. No. 3,811,983.

[52] U.S. Cl. .............. 428/172; 156/231; 156/232; 156/245; 264/1; 264/166; 264/214; 264/216; 428/913; 350/103; 350/288
[51] Int. Cl.² .................... B29D 7/08; G02B 5/12
[58] Field of Search ............ 161/2, 116, 4; 350/102, 350/103, 106, 109, 288, 292; 264/1, 166, 212, 213, 214, 216; 156/242, 243, 245, 231, 232, 239; 117/10; 428/156, 172, 913

[56] References Cited
UNITED STATES PATENTS

| | | | |
|---|---|---|---|
| 3,684,348 | 8/1972 | Rowland | 350/103 |
| 3,712,706 | 1/1973 | Stamm | 350/103 |
| 3,741,623 | 6/1973 | Mihalik | 350/103 |

*Primary Examiner*—George F. Lesmes
*Assistant Examiner*—Stanley S. Silverman

[57] ABSTRACT

Retroreflective sheeting is produced by bonding a multiplicity of cube corner formations to sheet material, and the cube corner formations are formed principally of a first resin formulation providing the body thereof and a second resin formulation providing the base thereof and the bonding to the sheet material. Cube corner formations are produced on a mold having a surface in which is formed an array of minute, contiguous cube corner recesses. The resin formulation initially deposited in the recesses is solidified substantially and the remaining depth of the recesses is filled with a bonding material which serves not only to level the cube corner formations, but also to bond them to the sheet material. The apparatus utilized is a continuously moving mold surface and has a plurality of stations for effecting the several steps of the process.

9 Claims, 12 Drawing Figures

RETROREFLECTIVE SHEETING AND METHOD AND APPARATUS FOR PRODUCING SAME

CROSS REFERENCE TO RELATED APPLICATION

The present application is a division of U.S. Pat. application Ser. No. 265,736 filed June 23, 1972 entitled METHOD FOR PRODUCING RETROREFLECTIVE SHEETING now U.S. Pat. No. 3,811,983 granted May 21, 1974.

BACKGROUND OF THE INVENTION

In many instances it is desirable to provide light reflective surfaces on various items for safety or decorative purposes, and this is often accomplished by the application of reflective coatings or elements having specular surfaces, e.g., polished metals or the like. It is also common to use sheetlike structures which have upon one or both surfaces any of various formations that are capable of reflecting impinging light rays, and this may be due principally to the angular relationship between the rays and the reflecting surface, or it may be due to the presence of a reflective coating on surfaces of the formations.

There has been a constant demand for retroreflective materials, i.e., materials capable of reflecting the predominate portion of light rays impinging thereon in a substantially parallel path toward the source of the light. Minnesota Mining and Manufacturing Company has sold a material under the trademark SCOTCHLITE which relies upon minute glass spheres embedded in a matrix of synthetic resin to provide such retroreflection. Another type of retroreflective element has employed molded members of cube corner configuration on one surface thereof, such members being of glass or synthetic plastic. Indicative of the efforts to use cube corner formations for retroreflective structures are Straubel U.S. Pat. No. 835,648 granted Nov. 13, 1906; Hedgewick et al. U.S. Pat. No. 3,258,840 granted July 5, 1966; and Jungerson U.S. Pat. No. 2,310,790 granted Feb. 9, 1943 and No. 2,444,533 granted July 6, 1948.

Cube corner reflectors molded from glass, and more recently from acrylic resins, have commonly been employed as safety devices on bicycles, automobiles and other vehicles. Although it has been suggested that the cube corner might be of small dimension, generally such formations have been relatively large in size, and the nature of the material from which the reflector has been fabricated generally resulted in structures of relatively rigid character which were not suited either for shaping for application to various substrates of nonplanar character or to use as a fabric which might be worn. Moreover, as the size of the cube corner formations is reduced criticality in control of angles and dimensions becomes far more acute, since even a minute deviation will seriously impair the ability of the material to retroflect light rays impinging thereon.

Novel composite retroreflective materials having minute, closely spaced cube corner formations, which return the great preponderance of light rays entering the front surface thereof, have recently been developed. These materials may be relatively flexible so as to permit shaping to conform to support surfaces of various configurations and to permit utilization as a fabric for application to, or formation into, wearing apparel, and they may be provided with an adhesive coating for convenient adherence to a support surface. It has also recently been proposed to provide a novel method for manufacturing such retroreflective material from synthetic resins in a manner that permits selection of resins to produce optimum characteristics; the method proposed is relatively simple and economical, and affords a high degree of control to ensure optimum development of the cube corner formations. These recent developments are the subject of copending applications for United States Letters Patent that have been filed in the names of the same inventor and assignee, now as U.S. Letters Pat. No. 3,684,348 granted Aug. 15, 1972 and U.S. Letters Pat. No. 3,689,346 granted Sept. 5, 1972.

Typically, some of the resins which may be used for the cube corner formations in such sheeting also exhibit relatively high levels of shrinkage upon transition from the liquid to the solid state. If not accounted for, such shrinkage tends to reduce very slightly the smoothness of the surface of the sheeting, which in turn produces a degree of light scattering. Use of resins exhibiting shrinkage to provide the cube corner formations is desirable in some instances and in other instances it is desirable to employ resins for the body of the cube corner formations which do not bond well directly to the sheet material by their own substance. Therefore, efforts have continued to adapt the processes of the aforementioned applications to the use of such materials.

Accordingly, it is an object of the present invention to provide novel retroreflective sheeting of substantially uniform dimensions wherein a multiplicity of minute cube corner formations provide a high level of retroflectivity and are provided by a composite structure.

It is also an object to provide such sheeting in which the cube corner formations are substantially perfectly formed and in which undesired light refraction in the sheeting retroreflectivity. minimized.

Still another object is to provide such sheeting having cube corner formations produced from a relatively shrinkable resin, which has a smooth, level front surface and which affords maximum retroreflectivity.

A further object is to provide novel apparatus for the production of high quality and uniform retroreflective sheeting, on a continuous basis.

SUMMARY OF THE INVENTION

It has now been found that a number of the foregoing and related objects can be readily attained in retroreflective sheeting comprising a body portion having smooth, substantially parallel opposite surfaces, and a multiplicity of minute cube corner formations closely spaced thereon and projecting from one of the surfaces thereof. Each of the cube corner formations has three faces and a base adjacent the body portion, with a side edge dimension of not more than about 0.025 inch, and is a composite of a first resin formulation providing the body of the cube corner formations and a second resin formulation substantially providing the base thereof. The body portion is formed separately from the cube corner formations, and the cube corner formations are bonded thereto by the second resin formulation with the close spacing substantially avoiding any smooth areas therebetween. The body portion and cube corner formations are fabricated from at least one transparent synthetic resin to thereby provide retroreflective sheeting as hereinbefore described. The first and second resin formulations used to form the cube corner formations are of different composition but have substantially the same refractive indices.

Preferably, each cube corner formation has one face parallel to one face of every other cube corner formation. Most desirably, the formations are substantially equal in size and are arranged in a pattern of rows and columns in which the center-to-center spacing between the cube corner formations in every row and in every column is in accordance with a uniform pattern. Most preferably, the apex of each cube corner formation is in alignment with the apices of all other formations located in the pattern row and column in which it is disposed, and ideally the apex of each cube corner formation is aligned with the center of its base. The body portion of the retroreflective material may advantageously be flexible for facile mounting on surfaces of various configurations. It is especially desirable that the resin formulation and the bonding material be of substantially the same refractive index suitable "first" and "second" resin formulations being selected from the group consisting of vinyl halide resins, (alk)acrylic ester resins, ethylenically unsaturated nitrile resins, monovinylidene aromatic hydrocardon resins, olefin resins, cellulose ester resins, polysulfone resins, polyphenylene oxide resins, and polycarbonates. The synthetic resin of the body portion is desirably selected from the class consisting of polyvinyl halides, polyethylene terephthalate polyesters, polyvinylidene chloride resins, polycarbonates, polysulfones, and cellulose ester polymers.

Additional objects of the invention are attained by the provision of apparatus for producing retroreflective sheeting on a continuous basis, which includes a frame and a support member having a substantially continuous path. The mold surface has formed therein an array of minute, contiguous cube corner recesses each with a maximum side edge of dimension of less than about 0.025 inch. Along the path of movement of the mold surface is provided a first material dispensing station for depositing a hardenable fluid synthetic resin formulation during travel of the surface thereby. A second material dispensing station is located downstream along the path therefrom, and is adapted to deposit a synthetic resin bonding material. Further downstream is provided a sheet material applying station, which includes pressure means positioned closely adjacent the molding surface adapted to urge the sheet material thereagainst and to thereby produce a composite structure from the sheet material, resin formulation, and bonding material. A stripping station of the apparatus effects the removal of the composite structure from the molding surface, and drive means is provided to move the molding surface substantially continuously along the path past the various stations.

In preferred embodiments, the apparatus additionally includes first treating means along the path downstream of the first material dispensing station for producing conditions sufficient to effect substantial solidification of the resin formulation. It desirably also includes second treating means positioned along the path at an intermediate location between the sheet material applying station and the stripping station for producing conditions sufficient to effect substantial solidification in a hardenable bonding material deposited at the second material dispensing station. The apparatus may also include resin formulation distributing means downstream along the path from the first material dispensing station, which distributing means may comprise a member of release material positioned to contact the mold surface during movement thereby. Preferably, the release material comprises a film of synthetic resinous material which is relatively deformable under the conditions of operation to permit conformation thereof to the underlying surface of the resin formulation during solidification thereof. Cooling means along the path upstream from the stripping station may be used to lower the temperature of the composite structure prior to stripping. The support member is most desirably a rotatably mounted drum having the mold surface on the circumference thereof, and the pressure means of the sheet material applying station is a roller having its axis of rotation parallel to that of the drum. The circumferential surface of the roller may be in a substantially fixed position adjacent to the molding surface to provide a nip of substantially constant spacing therebetween in cooperation therewith. At least the first treating means of the apparatus is appropriately provided by a device for radiating energy, and it will usually comprise means to heat at least the resin formulation to an elevated temperature above ambient.

DETAILED DESCRIPTION OF THE ILLUSTRATED EMBODIMENTS

Figure 1:
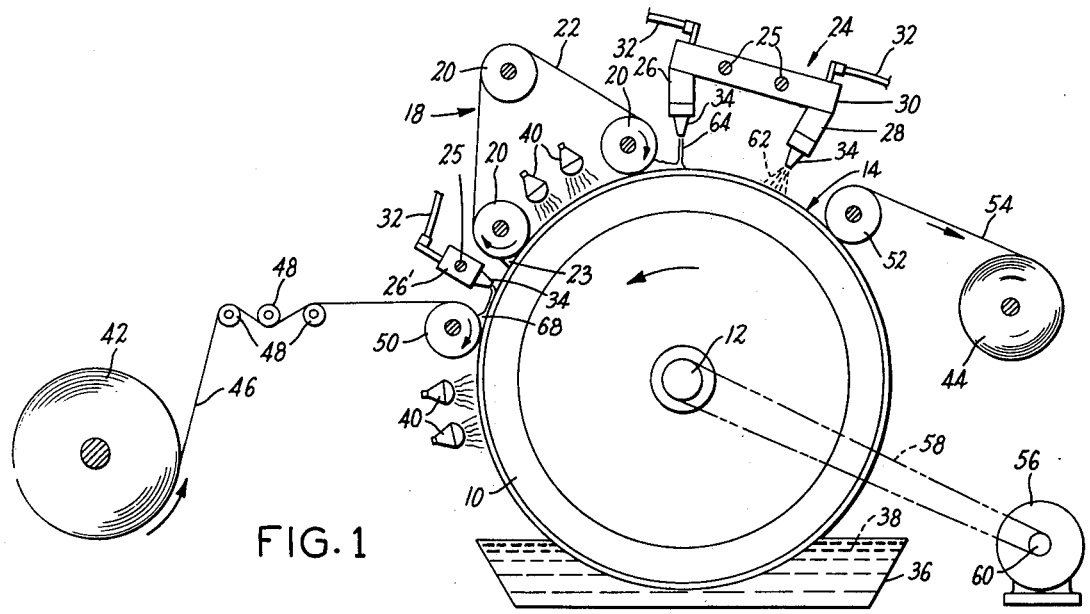
FIG. 1 is a partially diagrammatical elevational view of apparatus embodying the present invention.
Figure 2:
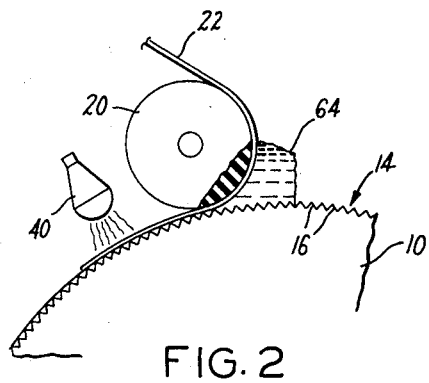
FIG. 2 is a fragmentary view in partial section to an enlarged scale of the apparatus of FIG. 1 at the sheet material applying location, illustrating the liquid distributing action occurring at the nip between the molding drum and the relatively resilient pressure roller.
Figure 3:
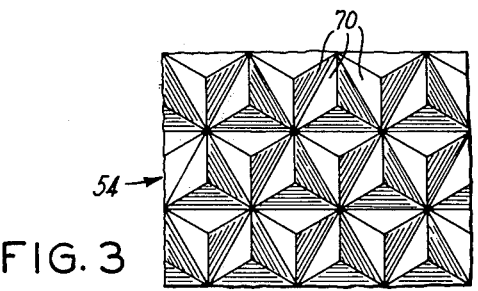
FIG. 3 is a fragmentary view to a greatly magnified scale of the rear surface of retroflective sheeting embodying the invention.
Figure 4A:
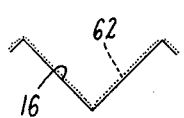
FIGS. 4A–E are diagrammatical representations of a cube corner recess in the molding drum in the progressive deposition and subsequent hardening stages which occur in the resin formulation during the production of a cube corner portion.
Figure 4B:
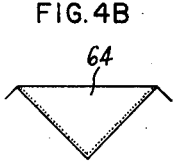
Figure 4C:
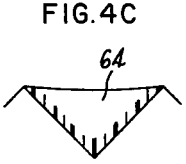
Figure 4D:
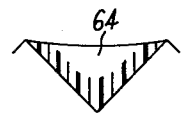
Figure 4E:
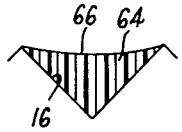
Figure 5A:
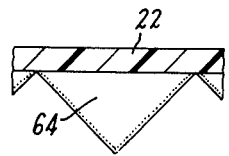
FIGS. 5A–D are diagrammatical representations of the progressive stages of the production of retroreflective sheeting in accordance herewith showing the release member and sheet material over the cube corner recess.
Figure 5B:
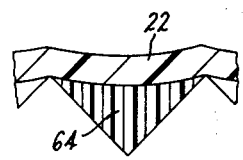
Figure 5C:
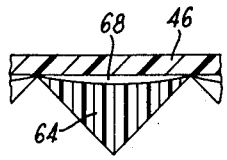
Figure 5D:
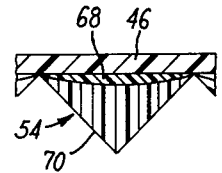

Turning now in detail to FIGS. 1 and 2 of the drawing, therein illustrated is apparatus for producing, on a continuous basis, retroreflective sheeting of the type illustrated in FIG. 3. The apparatus includes a molding drum 10 mounted upon an axle or shaft 12 for rotation in the direction indicated by the arrow (i.e., counterclockwise). The circumferential surface portion of the drum 10, generally designated by the numeral 14, has formed therein a multiplicity of identical, contiguously arranged cube-corner recesses or indentations 16, the configuration of which can be readily understood by reference to FIG. 3, since the configuration of the sheeting rear surface shown therein is complementary to that of the surface portion 14. The portion 14 may consist of a multiplicity of metallic plates bonded to the drum 10 by a layer of appropriate adhesive, with the plates being disposed entirely about the circumference of the drum 10 to provide a molding surface, i.e., that has a substantially continuous array of cube-corner recesses 16 therein.

A head assembly, generally designated by the numeral 24, is mounted above the drum 10 at one point about its circumference for reciprocal movement thereacross on the pair of horizontal rods 25. The assembly 24 consists of a coating head 26 and a spray head 28, the purpose of which will be explained hereinafter. The heads 26, 28 are supported upon a suitable base 30, to which feed lines 32 are attached for delivery of the desired materials, and each of the heads 26, 28 is provided with a nozzle 34 that is suitably configured for its intended function. Downstream from the head assembly 24 is a release member assembly, generally designated by the numeral 18, consisting of three triangularly disposed rollers 20 and an endless belt 22 of release material extending thereabout. The rollers 20 position the belt 22 in contact with the surface portion 14, and a small air knife 23 or comparable device is provided to ensure separation of any elements that might adhere to the surface of the belt 22. The element 23 may also include a doctor blade for cleaning of the belt 22. A second coating head 26' having a feed line 32 and a nozzle 34 is mounted for horizontal reciprocation upon a rod 25 on the downstream side of the release member assembly 18, and supported below the drum 10 (by means not shown) is a trough or tank 36 containing a liquid cooling medium 38, such as water. The tank 36 is positioned for passage of the circumferential portion 14 of the drum 10 through the water 38 during rotation, and two sets of heat (or other energy) radiating elements 40 are mounted (also by means not shown) at spaced locations adjacent the drum 10 for treatment of materials deposited thereon.

Rotatably mounted film feed and take-up reels 42 and 44 respectively, are positioned on opposite sides of the drum 10. In passing from the feed reel 42 to the drum 10 the film 46 passes first between a set of three tension rollers 48 and thereafter about a relatively resilient pressure roll 50, the latter being mounted with its surface closely adjacent that of the drum 10 and with their respective axes of rotation parallel. A stripping roll 52 is similarly mounted on the opposite side of the drum 10, and the formed reflective sheeting generally designated by the numeral 54, passes about it and to the take-up reel 44. The motor 56 drives the drum 10 in a conventional manner, such as through the drive belt 58 provided about the shaft 12 and shaft 60 thereof.

Operation of the apparatus for the production of the sheeting 54 will be apparent from the foregoing and the following description, in connection with which reference will also be made to FIGS. 3–5. As the drum 10 continuously rotates, a suitable hardening activator or catalyst 62 is sprayed directly upon its surface 14 from the spray head 28 (FIG. 4A); in some embodiments the material 62 may be a wetting agent, plasticizer or other substance. A hardenable resin formulation or molding material 64 in fluid form is then deposited thereupon (FIG. 4B) from the coating head 26, and is uniformly distributed thereover by the endless belt 22 of release material. The heating elements 40 promote solidification of the formulation 64 through the progressive stages of FIGS. 4C–E, such as by cross linking or polymerization depending upon the nature thereof, and the positions of the belts 22 at the stages of FIGS. 4B and E are shown in FIGS. 5A and B. After stripping of the belt 22, the depressions 66 resulting from shrinkage in the formulation 64 are filled with a bonding material 68 dispensed from the coating head 26'. The film 46 is continuously withdrawn from the feed reel 42 and applied against the drum 10 by the pressure roll 50, which cooperates with the drum 10 to provide a nip at which the bonding material 68 is uniformly distributed over the surface of the drum 10, and at which intimate contact is effected between the material 68 and the film 42 (FIG. 5C).

The freshly applied material 68 and film 42 travel together past the second bank of heat lamps 40, whereat hardening of the material 68 and bonding thereof to the film 42 are concurrently effected. Thereafter, the cooling water 38 in the trough 36 permanently sets the materials 64, 68, which together provide cube corner formations 70 (FIGS. 3 and 5D) bonded to the film 46. The completed reflective sheeting 54 is then stripped from the drum 10 about the roll 52 and finally wound upon the take-up reel 44.

As has been indicated, a key aspect of the present invention resides in the provision of a method and apparatus for the production of sheeting having minute cube corner formations which are closely spaced so as to avoid substantially any smooth or flat areas therebetween. Although the cube corner formations may have a side edge dimension of up to 0.025 inch, the preferred structures utilize a side edge dimension of not more than 0.010 inch and most desirably on the order of 0.004–0.008 inch. The thickness of the sheet material in the composite structure may vary somewhat depending upon the particular application. However, it will generally have a thickness of about 0.002–0.030 inch, and preferably it will be about 0.003–0.010 inch thick.

By construction the composite structure from a separate body portion to which are adhered the separately formed cube corner formations, it is possible to achieve the maximum control over the cube corner formations and also to select different resins for those components, which is often desirable to achieve an optimum balance of properties. The resin formulation and bonding material used to produce the composite cube corner formations may also be of different compositions, and this may be particularly desirable when the resin formulation is relatively non-adherent by its own substance to the body portion. Although it is theoretically possible to emboss the cube corner formations into the surface of preformed synthetic plastic material, efforts to utilize such a technique in the production of the minute cube corner formations used in the sheeting of the present invention have proven unsatisfactory. This is largely because non-uniform flow of the material into the recesses of the embossing member adversely affects the retroreflectivity of the resultant product. Moreover, variations in thickness of the sheet material which is embossed tend to diminish the precision with which the cube corner formations may be developed. Efforts to mold the cube corner formations and the body portion of the product simultaneously have also proven generally unsatisfactory because of the difficulty in obtaining adequate flow of the resin into the recesses of the mold, and in addition such a procedure requires that the same resin be employed for all portions of the composite structure.

Thus, the present invention has proven particularly advantageous in affording optimum control over the development of the cube corner formations and in permitting a selection of distinct resins for the body portion and for the cube corner formations. Moreover, application of a bonding material permits the use of materials that exhibit relatively large decreases in volume upon solidification, while ensuring relatively low levels of light scattering and maximized retroreflectivity of the sheeting produced. In the apparatus, a substantially continuous mold surface is provided which has precisely formed cube corner recesses which are so closely spaced as to substantially avoid any smooth areas therebetween. Although the mold may be formed from a synthetic resin, the preferred mold has a metallic surface to ensure very smooth, precise surfaces on the cube corner faces and to minimize the likelihood of deterioration during extensive use, as well as of possible adhesion between the molding material and the surface of the mold. Accordingly, the mold may be fabricated directly from a suitable metal by engraving, hobbing or otherwise forming the cube corner recesses therein. Alternatively, a suitably engraved or otherwise formed metallic member may be used as a master mold for forming the desired mold element by the deposition of metal thereon to form a layer of sufficient thickness which is then stripped therefrom. These stripped impressions which may be made by conventional electroforming procedures are then used as the mold elements after mounting upon a suitable support surface to avoid injury thereto and the mold surface may then be developed on a suitable support member from a multiplicity of such elements. In order to minimize corrosion of the metallic surfaces of the mold, it has been found desirable to provide a highly inert metallic coating thereon such as may be obtained by depositing gold or a gold alloy thereon.

As illustrated, the support for the mold surface is most desirably provided by a rotatably mounted drum, since such a drum facilitates continuous application of materials and stripping of the composite product, and also provides firm support for the mold elements thereon. Other types of support members are also feasible, such as continuous flexible belts or even revolving disks; however, disadvantages such as non-linearity in the product may render the latter alternative less attractive due to the manner in which angularly impinging light rays would be reflected thereby. The means by which the mold surface is secured to the support may vary considerably depending upon the degrees of permanency and rigidity and the heat transfer characteristics desired; for example, they may be bonded with appropriate adhesives, or they may be affixed with suitable screws, rivets, pins or the like.

The design of the means for dispensing materials upon the moving surface and for stripping the composite therefrom may also vary to a considerable degree from those of the illustrated embodiment, depending primarily upon the type of support member employed, and different devices appropriate for substitution will be apparent to those skilled in the art. In the method, efforts are made to minimize any discrepancies in thickness and to minimize the thickness of any web portion formed of the molding material utilized in the production of the cube corner formations. This is conveniently accomplished by use of the release member and by the application of pressure at the time that the body member is placed upon the mold surface, thereby evenly distributing the deposited material in each instance and to some extent expressing or extruding excessive amounts outwardly of the interface. Moreover, the application of pressure facilitates the flow of the fluid molding material into the recesses of the mold surface. Accordingly, it is especially desirable to employ the sort of release member assembly illustrated, as well as a member or element that cooperatively forms a nip with the mold surface at the location at which the sheet material is applied, since in the latter case adequate pressure for intimate contact with the molding material and uniform distribution thereof over the mold surface and into the recesses thereof may thereby be achieved simultaneously.

Although an endless belt type of release member is shown in the drawing, numerous different devices may be substituted with comparable advantage. For example, the release member may be provided by a thin film of resinous material which is applied in much the same manner as the film which provides the body portion of the sheeting, and thereafter stripped and discarded. The material from which the release member is fabricated will depend upon a number of factors including the nature of the resin formulation used for the cube corner portions, the temperature conditions employed, the type of system of which the release member is a part, etc. The criteria used in the selection of an appropriate release material will generally include its level of adhesion to the cube corner portions under the conditions of operation and its strength, to ensure relatively facile stripping, and its flexibility and/or heat distortion temperature. The latter factors are significant due to the fact that it is desirable that the release material be capable of slight distortion. This will enable it to conform to depressions formed when the resin formulation is of a relatively shrinkable type, thereby accommodating the change in contour rather than tending to withdraw the cube corner portion from its recess, as might produce undesirable structural or dimensional variations. Typical of the materials that may be used as the release member under appropriate circumstances are the so-called "release papers" known in the industry (e.g., silicone-coated paper), films of polyolefins such as polypropylene and polyethylene, films of tetrafluoroethylene type polymers, etc. An especially desirable manner of operation in this regard is found to result from the use of a throw-away film of polyethylene for the production of elements from acrylate polymers, since polyethylene affords a desirable balance of strength, flexibility and non-adhesion under suitable hardening conditions for the acrylate polymer.

Flow of the molding material into the recesses may also be facilitated by the prior application of a solvent, plasticizer, wetting agent or other flow promoting agent (herein collectively referred to as "wetting agent") to the mold surface. This enhances the fluidity of the molding material about the surfaces of the recesses and greatly promotes optimum fillage thereof.

The technique utilized for achieving solidification of the resin formulation and bonding material will vary with the particular material selected. For example, when a molten synthetic resin is employed solidification may be accomplished merely by cooling thereof, and this may be accomplished by chilling the mold, by directing cool air against the surface, or simply by allowing the heat energy to dissipate by radiation therefrom. When the molding material is a "B-stage" or partially polymerized resin solidification may be accomplished by the application of heat for a period of time sufficient to achieve the desired degree of further polymerization. When the material is cross linkable formulation solidification may be accomplished by promoting cross linking of the component materials through any convenient means, which will depend upon the nature of cross linkable material. As is well known in the art, cross linking may be effected by use of free radical initiators, heat, high energy radiation and the like, and the radiating elements depicted in the drawings may therefore comprise any suitable source of energy. Thus, they may simply be an infra-red or other heat source, a source of alpha or beta particles, gamma or x-ray radiation, photons, etc. Moreover, it will be appreciated that the deposited material may be essentially monomeric in character and that the solidification thereof may be accomplished by polymerization in situ within the cube corner recesses of the mold surface; such polymerization may be promoted by heat, free radical initiators, or high energy radiation, and the actinic source may be internal of the support member if so desired. In still another technique, a plastisol formulation may be employed in which the resin is fluxed by the plasticizer upon the application of heat. Generally, when the hardenable material is uncovered during solidification, such as when no release member is used, one of the techniques enumerated which does not produce elevated temperatures will be preferred, and in any event combinations of two or more techniques may be utilized to obtain the desired solidification. It should be understood that, although solidification of the resin formulation may occur at virtually any point during the method (i.e., prior to, concurrently with, or subsequent to the deposits of the bonding material or the sheet material application step), it is preferably effected prior to deposition of the bonding material. The term "resin formulation" has been employed herein to refer broadly to the material deposited as a fluid, regardless of its stage of solidification at the point of reference.

Various synthetic resins may be employed for the cube corner formations and for the sheet material including polymers of (alk)acrylic acid esters, such as polymethyl methacrylate and polybutyl acrylate, cellulose esters, such as cellulose acetate polymer, cellulose acetate/butyrate copolymer, and cellulose propionate polymer; vinyl halides such as polyvinyl fluoride; vinylidene halides such as polyvinylidene chloride; monovinylidene aromatic hydrocarbon polymers such as polystyrene and styrene/acrylonitrile copolymers; ethylenically unsaturated nitriles such as polyacrylonitrile; polycarbonates; polyesters, such as polyethylene terephthalate; polyphenylene oxide; polysulfones; and polyolefins, such as polyethylene and polypropylene. Interpolymers of various of the several above-mentioned types of monomers, e.g., vinyl chloride/vinyl acetate copolymers, may also be employed, as may be mixtures of polymers. The particular resin selected for the components of the composite structure will vary depending upon the application, the thickness desired for the body member, the desire for flexibility, and the need for achieving inter-adhesion therebetween. For outdoor applications, materials which are moisture resistant, ultraviolet resistant and abrasion resistant are particularly advantageously employed at least for the body portion since that portion is generally exposed to the atmosphere and requires good weathering characteristics. Moreover, it will be appreciated that the sheet material may itself be a laminate of films or sheets of two different synthetic resins, and it may be provided with coatings of appropriate materials. The resins preferably employed for the body portion include polyvinyl halide, polyethylene terephthalate, polyvinylidene chloride, polycarbonates, polysulfones and cellulose ester polymers.

The resins preferably employed for the cube corner formations comprise (alk)acrylic acid ester resins, acrylic-modified vinyl chloride resins, vinyl chloride/vinyl acetate copolymers, ethylenically unsaturated nitrile resins, monovinylidene aromatic hydrocarbon resins, olefin resins, cellulose ester resins, polysulfone resins, polyphenylene oxide resins and polycarbonates. Generally, cross-linkable acrylic monomer systems are preferred for stability and optical properties, and these systems may be in whole comprised of acrylic monomers or only in part, such as PVC containing 10–70 per cent of a cross-linkable acrylic monomer system and catalyst. As has been mentioned, the cube corner element and the interlayer element need not be of the same composition; however, in such a case it will normally be desirable to match as closely as possible the refractive indices of the different resins used.

In selecting the materials employed for the sheeting it should be remembered that long lasting properties will require resins which do not have readily volatilizable plasticizers or other components, and which have an acceptable level of light stability. Thus, stabilized formulations are desirably employed when the resin itself is susceptible to light or oxygen degradation. By proper selection of the resin systems, the sheet material may also provide a valuable degree of protection for the resin of the cube corner formation, which may exhibit relatively poor stability when the cube corner formations are reflectively coated and further coated with a lacquer and/or adhesive. These coatings also may act as protective layers since the body portion will, in many applications, serve as a barrier layer for ultraviolet radiation, vapor, gases, etc. Moreover, the sheet material is desirably fabricated of a resin which affords a high degree of abrasion resistance since aberrations in the front surface of the composite structure will greatly reduce its retroflectivity.

It should be appreciated that the selection of different resins for the component portions of the product must recognize the need for compatibility of the resins involved. For example, one resin must not contain a substance which is deleterious to the other and which will migrate thereinto across the interface. Moreover, when plasticized materials are employed it is desirable to use plasticizers which do not readily migrate, and/or to select formulations for both component resins in which the plasticizer contents are balanced so as to avoid a degree of migration therebetween which might materially affect the properties of the component portions.

It will be readily appreciated that the cube corner formations must have smooth faces and that the intersecting faces thereof should provide essentially perfect cube corners. Deviation from a perfect cube corner or surface irregularity will materially reduce the retroreflectivity of the formation, and is desirable only under certain controlled circumstances. Although the cube corner array illustrated in FIG. 3 may be preferred, different patterns may be produced (such as by an axial shift of the formations or by varying spacings to produce square rather than triangular faces thereon) without departure from the novel concepts of the invention thereof. In addition, while the cube corner formations in the illustrated embodiment have a uniform orientation within the array, it is possible to employ a pattern in which certain of the cube corner formations are disposed in such a manner that their faces are not parallel to any of the faces of the adjacent cube corner formations. Moreover, certain of the cube formations may be disposed with their apices aligned other than vertically over the center of their respective bases.

By uses of a sheet material of a relatively flexible resin, the composite structure may be readily shaped to various support surfaces, such as the corners of buildings, the contour of hand rails, etc. Moreover, since the composite structure may be very thin and highly flexible, it may be readily applied to fabrics used as garments, or it may itself be used in such a manner, thus affording a great deal of night-time visibility to the wearer. Exemplary uses for safety applications are tabs and stripes on jackets and rainwear, tags that may be worn at various points upon the body, reflective patches for hats, reflective welting for the production of various garments, etc.

Illustrative of the efficacy of the present invention is the following specific example, wherein all parts and percentages are on a weight basis, unless otherwise specified and wherein reference is made to the appended drawings.

EXAMPLE ONE

Part A

An engraved master plate is formed from aluminum using an appropriate cutting tool to generate a pattern or array of cube corner formations substantially as illustrated in FIG. 3 of the drawing. Nickel electroforms are prepared from the master plate and are thereafter assembled into a larger mold member, a number of which are in turn then secured to a support member to develop a mold surface thereon. The cube corner recesses of the mold surface are closely spaced and are substantially free from smooth areas therebetween; they are about 0.00235 inch deep and about 0.0056 inch on a side.

Onto the mold surface is applied a very dilute solution of acetone and a peroxide, and the acetone is allowed to evaporate. An acrylic monomer formulation containing monomeric acrylic compounds (cross-linkable acrylic monomers) is then deposited on the mold surface in an amount sufficient to slightly overfill the recesses. A film of about 0.001 inch thick polyethylene is then applied thereover with sufficient pressure to produce intimate contact and to squeegee away excess resin formulation. The resin is then heated to a temperature of about 175° Centigrade for about 1–3 minutes to effect solidification thereof, after which the polyethylene film is stripped from the mold and discarded.

A second application of the same acrylic formulation and catalyst is then made in an amount sufficient to fill the cavities resulting from shrinkage during solidification of the initially applied resin. A polyvinyl fluoride film, about 0.001 inch in thickness, is then applied against the mold surface under sufficient pressure to cause intimate contact between the film and the newly deposited resin and to spread and uniformly distribute the latter over the mold surface. Upon reheating, again to a temperature of about 175° Centigrade and for a period of about 2–3 minutes, the second charge of resin formulation is solidified, thereby firmly bonding the elements produced from the first deposit of resin to the polyvinyl fluoride film; the composite is then quenched in water and stripped from the mold surface.

Part B

A similar product is produced in substantially the same manner, but with the omission of the second resin application step. More particularly, rather than covering the first deposit of resin with polyethylene film as in Part A, the polyvinyl film is initially applied and bonded to the molded elements. This composite is similarly quenched and removed from the mold surface.

Upon testing of the sheeting produced respectively in Parts A and B hereof with a controlled light source, each is found to be highly retroreflective within a narrow cone over angles of incidence to the front surface of up to about 45°; however, the sheeting of Part A is seen to exhibit a perceptibly greater level of light reflection than does the product of Part B. Microscopic analysis shows the product of Part B to have very slight depressions in its front surface, whereas the product of Part A is seen to be substantially free therefrom. In each instance, the rear surface of the sheeting has minute cube formations bonded thereto in a contiguous array conforming to the illustration of FIG. 3, and the product is highly flexible and readily adapted for fabric applications.

Thus, it can be seen that the present invention provides a novel method for the production of retroreflective sheeting of substantially uniform dimensions, wherein a multiplicity of minute cube corner formations provide a high level of retroreflectivity. The cube corner formations are substantially perfectly formed, thus minimizing undesired light refraction; they may be produced from a relatively shrinkable resin, with the novel sheeting nevertheless having a smooth, level front surface and affording maximum retroreflectivity. Flexible reflective sheeting having such characteristics may be produced relatively inexpensively and with a high degree of facility and speed by the present method, and the invention also provides novel apparatus for the production of high quality and uniform retroreflective sheeting on a continuous basis.

Having thus described the invention, I claim:

1. Retroreflective sheeting comprising a body portion having smooth, substantially parallel opposite surfaces, and a multiplicity of minute cube corner formations closely spaced thereon and projecting from one of said surfaces thereof, each of said cube corner formations having three faces and a base adjacent said body portion with a side edge dimension of not more than about 0.025 inch and being a composite of a first resin for formulation providing the body of the cube corner formation and a second resin formulation substantially providing said base, said body portion being formed separately from said cube corner formations and said cube corner formations being bonded to said body portion by said second resin formulation with said close spacing substantially avoiding any smooth areas therebetween, said body portion and cube corner formations being fabricated from [at least one] transparent synthetic resin and said first and second resin formulations of said cube corner formation being of different composition and of substantially the same refractive index to provide retroreflective sheeting in which those light rays entering through the other of said surfaces of said body portion predominately pass through said body portion and into said cube corner formations and are reflected thereby back through said body portion along paths that are substantially parallel to their paths of entry.

2. The retroreflective material of claim 1 wherein each cube corner formation has one face parallel to one face of every other cube corner formation.

3. The retroreflective material of claim 1 wherein said cube corner formations are substantially equal in size and are arranged in a pattern of rows and columns in which the center-to-center spacing between cube corner formations in every row and between cube corner formations in every column is in accordance with a uniform pattern.

4. The retroreflective material of claim 3 wherein the apex of each cube formation is in alignment with the apices of all of the cube corner formations located in the pattern row and column in which it is disposed.

5. The retroreflective material of claim 1 wherein the apex of each cube corner formation is aligned with the center of its base.

6. The retroreflective material of claim 1 wherein said cube corner formations are less than 0.010 inch along the side edges.

7. The retroreflective material of claim 1 wherein said body portion is flexible for mounting on surfaces of various configurations.

8. The retroreflective material of claim 1 wherein said first resin formulation is selected from the group consisting of vinyl halide resins, (alk)acrylic ester resins, ethylenically unsaturated nitrile resins, monovinylidene aromatic hydrocarbon resins, olefin resins, cellulose ester resins, polysulfone resins, polyphenylene oxide resins and polycarbonates.

9. The retroreflective material of claim 1 wherein said synthetic resin of said body portion is selected from the class consisting of polyvinyl halides, polyethylene terephthalate, polyvinylidene chloride, polycarbonates, polysulfones and cellulose ester polymers.

* * * * *

UNITED STATES PATENT AND TRADEMARK OFFICE
CERTIFICATE OF CORRECTION

PATENT NO. : 3,935,359
DATED : January 27, 1976
INVENTOR(S) : William P. Rowland It is certified that error appears in the above-identified patent and that said Letters Patent are hereby corrected as shown below:

Column 12, line 60, "[at least one]" should be deleted;

Column 13, line 14, after "cube" insert -- corner --.

Signed and Sealed this eleventh Day of May 1976

[SEAL]

Attest:

RUTH C. MASON
Attesting Officer

C. MARSHALL DANN
Commissioner of Patents and Trademarks